INVENTOR.
James L. Bloomer

BY Paul & Paul
ATTORNEYS.

United States Patent Office 3,608,276
Patented Sept. 28, 1971

3,608,276
GAS CHROMATOGRAPHY COLLECTOR
James L. Bloomer, Philadelphia, Pa., assignor to Temple University of the Commonwealth System of Higher Education, Philadelphia, Pa.
Filed Dec. 24, 1968, Ser. No. 786,664
Int. Cl. B03c 3/01
U.S. Cl. 55—126        6 Claims

ABSTRACT OF THE DISCLOSURE

An apparatus is provided for collecting small samples from gases by chromatographic techniques by precipitating the desired sample from a gas containing the desired sample.

BACKGROUND OF THE INVENTION

Prior art chromatographic techniques have generally relied upon, as a basis, the fact that a given solid may absorb, in varying degrees, the different constituents of a mixture present in a solution, or in a mixture of gases. Generally, such techniques have embodied the filling of a tube with a powdered adsorbing solid, followed by connection of one end of the tube with the source of the mixture from which one or more constituents are desired to be collected. The constituents of the mixture are gradually adsorbed as they pass through the column. The result is usually the adsorption of each distinct solute as a definite layer in the column, with the most strongly adsorbed substance at the top of the column, with successively less adsorption in layers with progression toward the bottom of the column as the various solutes are separated from the solution. If the solutes are of substances having different colors, the separation in the column produces a plurality of layers of different colors.

Other types of chromatography, for example with respect to liquid solution, have relied upon separating constituents of solutions based upon the relative specific gravities, the separation being unrelated to distinct color bands in the tube. Thus, the term "chromatography" has come to include any means of separation of constituents of a mixture, particularly with regard to the field of gas chromatography.

Collection techniques now utilized involve separation of components and directing a desired component with its carrier gas through a precipitation process.

SUMMARY OF THE INVENTION

The present invention is directed toward providing a simple and efficient collector for gas chromatography, wherein, after the undesired components of a multiple component gas are first separated from the desired component and its carrier gas, the latter are introduced into a glass tube, with the gas mixture in the tube then being immediately passed through an electrostatic field which causes precipitation of the desired specimen from the carrier gas.

Accordingly, it is a primary object of this invention to provide a novel apparatus for collecting specimens by subjecting the gas to a high voltage electrostatic charge.

It is another object of this invention to provide a novel apparatus for use in gas chromatography, comprising a tube which is adapted to be connected to a gas source at one end, with temperature controlling means being preferably provided for the tube, and with means for electrostatically precipitating a desired specimen of the gas within the tube.

It is a further object of this invention to accomplish the above object, wherein the electrostatic precipitation is effected by means of high voltage between electrodes, one such electrode being disposed outwardly of the tube, and the other being disposed inwardly thereof.

It is yet another object of this invention to accomplish the above object, wherein the inwardly disposed electrode is encased in its own tube, which itself is disposed inwardly of the primary gas-carrying tube.

It is a further object of this invention to provide a novel method of collecting gas samples comprising the steps of providing a carrier gas containing the desired sample through a glass tube, preferably bringing the gas to a desired temperature, and passing the gas with the sample through a high voltage electrostatic field during its passage through the tube for precipitation of the sample from the carrier gas.

Other objects and advantages of the present invention will become readily apparent to one skilled in the art from a reading of the following brief description of the drawing figures, detailed description of the preferred embodiment, and the appended claims.

Figure 1:
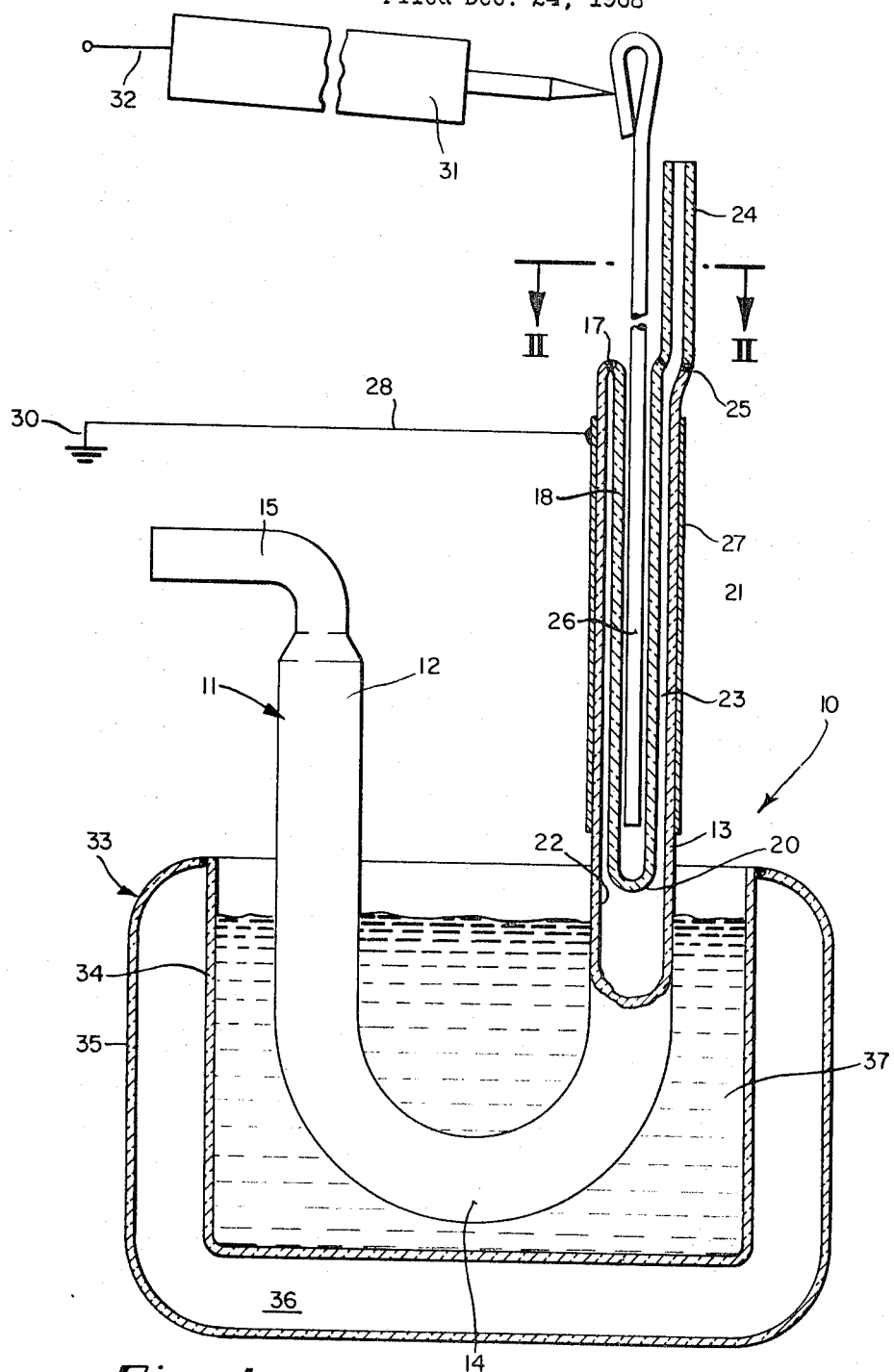
FIG. 1 is a schematic view of the apparatus of this invention, with portions thereof being illustrated in vertical section for the sake of clarity, whereby specimens or samples may be collected according to this invention.
Figure 2:
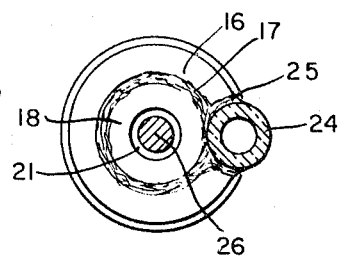
FIG. 2 is an enlarged transverse sectional view of a portion of the apparatus illustrated in FIG. 1, taken generally along the line II—II of FIG. 1.

Referring now to the drawings in detail, reference is first made to FIG. 1, wherein there is illustrated the apparatus of this invention, generally designated by the numeral 10, which includes a generally U-shaped preferably glass tube 11, having opposite legs 12 and 13, with a connecting bottom portion 14. The tube 11, particularly in laboratory scale work may, for example, be of five millimeters in diameter, and may have a piece of glass tubing 15 connected thereto, for example of three millimeters in diameter, for connection of the tube 11 to a suitable gas source.

The exit leg 13 of the U-shaped tube 11 has an upper end 16, to which is heat sealed by means of a glass-to-glass Dewar seal 17 to inner concentric tube 18. The tube 18 comprises an elongated pocket member has a closed bottom 20, and an open upper end 21, and extends substantially throughout the length of the exit leg 13 of the U-shaped tube 11. The tube 18 is spaced radially inwardly and centrally of the inner wall 22 of the U-tube leg 13, to define an elongated annular channel 23 between the tube 18 and the tube leg 13, for the passage of gas therethrough.

An additional small diameter tubing portion 24 is heat sealed at 25 to comprise a gas outflow tube.

An electrode 26, in the form of a large diameter nickel wire is disposed in the inner well 21 of the tube 18, and an opposite electrode 27 of metal foil is disposed about the outer surface of the tube leg portion 13. The metal foil 27, it will be noted, may be disposed physically against the outer surface of the tube leg portion 13, or may be disposed on a sleeve (not shown), of Pyrex glass, or the like, fitted over the leg portion 13 of the tube 11, as desired.

The foil 27 is connected by a conductive lead, such as copper wire, to a suitable ground 30.

A source of high voltage is provided between the foil electrode 27 and the wire electrode 26, preferably comprising a source of high voltage alternating current which may be provided by a vacuum leak detector, or Tesla Coil, which has a lead 32 for connection to an ordinary 115 volt A.C. source of current, and which, when brought near or into contact with the upper end of the wire electrode 26, provides a high voltage source of 10,000 to 20,000 volts, at very low current.

A source of reaching and maintaining a desired temperature for the gas conveyed within the tube 11 is provided, and one means for accomplishing this to maintain the carrier gas well below the boiling point of the substance being collected is illustrated in FIG. 1. While the source 33 of arriving at and maintaining a desired preselected or pre-determined temperature for gas conveyed through the U-shaped tube 11 may take any desired form, it is generally necessary to avoid the tendency of the substance being collected to remain in gaseous form and therefore a coolant bath apparatus 33 may optionally be used about the connection portion 14 (or bottom) of the tube 11 to maintain the desired specimen below its boiling point in the gas.

The bath apparatus 33 may comprise a container of dual wall construction 34 and 35, having a void 36 therebetween, from which a substantial amount of air has been removed, to create a high partial vacuum condition, similar to that present in the ordinary Thermos bottle, for providing heat insulation characteristics for the bath apparatus 33. A liquid 37 may be disposed in the apparatus 33, comprising a suitable coolant for the particular gas being conveyed through tube 11. Such a coolant may be Dry Ice and acetone, liquid nitrogen, or any other suitable gas coolant.

Operation

In accordance with the utilization of the apparatus 10 of this invention, a suitable carrier gas, such as pure helium, of predetermined amount is allowed to enter the inlet 15 of the U-shaped tube 11, with the carrier gas containing only the substance which is desired to be precipitated out of the gas, such as any of the fatty acid derivatives, isomers or any heat-stable compound. The mixture of the carrier gas and the specimen is thus preferably brought to a sufficiently low temperature to prevent boiling of the specimen, for example by reducing the temperature of the same during its passage through the connection portion 14 of the tube 11, in the coolant bath 37. As the predetermined amount of gas enters the tube 11, the retention time may be determined for the same within the tube 11, by watching the trace on an oscilloscope which is suitably connected to the inlet and outflow portions 15 and 24 of the tube 11.

The particles thus desired then pass in their gas mixture, through the annulus 23 between the tubes 18 and 13, whereby such particles enter an electrostatic field caused by applying the high voltage source 31 between the electrodes 26 and 27. As the particles enter the field between the electrodes, energy is imparted to the particles, in the form of charges which drive the particles toward an oppositely charged electrode, whereby the energy level of the particle is reduced, causing a change in phase of the particles from gaseous to liquid form, hence causing precipitation of the desired particles onto the tube walls, in liquid form.

Such particles may then be removed from the tube 11, by applying a solvent (for example ether) into the tube, which is collected, along with the particles, followed by evaporation and distillation of the solvent. It will be noted that samples of particles, for example radioactively labeled materials, of an order size of 50 micrograms may be injected into the carrier gas, with the bulk of such samples being collected by this process.

It will be particularly noted, that in studies involving radioactive degradation of a large number of fragments from various microbial metabolites, the apparatus of this invention has been found to be particularly useful, in that there was present the problem of collecting large numbers of very small samples of radioactively labeled materials. The apparatus of this invention is thus highly desirable, wherever large numbers of such fragments are desired, in that large numbers of collecting apparatus 10 of this invention may be provided, each being relatively inexpensive, and yet, highly efficient. Furthermore, the apparatus of this invention, which utilizes electrostatic precipitation, avoids aerosol formation, i.e. the presence of small particles of the substance which is desired to be collected, in its gaseous carrier. Still further, the apparatus of this invention permits ready removable of the precipitated samples, for exchange by evaporation and distillation. Thus, in many studies, such as the one mentioned above, it has been possible to provide large numbers of pure samples by this method of gas chromatography, with relative ease and minimal expense.

Still further, the apparatus of this invention has been found to be highly useful for quantitative collection of samples of the size of one milligram or better, of material of reasonably low volatility. With fifty microgram sized samples of compounds of low volitility, the apparatus has been found to be capable of collecting at least seventy percent quantitatively. This has been determined by reinjection of the sample after collection for a second collection.

The apparatus disclosed herein is additionally unique in that it permits highly efficient analysis with relatively inexpensive equipment, without contamination, in that most of the apparatus components are readily fabricated, for directly and immediately passing the specimens to a precipitation zone which utilizes precipitation techniques that maximize the degree of specimen precipitation due to placement and arrangement of the precipitation electrodes relative to the flow of the gas containing the specimens.

It will be apparent from the foregoing, that various modifications may be made in the construction of the apparatus of this invention, as well as in the use thereof, without departing from the spirit and scope of the invention as defined in the appended claims.

What is claimed is:

1. An apparatus for use in laboratory scale gas chromatography, for collecting samples of a substance from a gas, comprising a generally U-shaped tubular member, with an inlet end of said U-shaped member having a gas inlet thereto, with the opposite or outlet end of said U-shaped member having a gas outlet connected thereto, with said outlet end being provided wtih a one-piece pocket member disposed in depending relation from said outlet end of said U-shaped member in spaced relation to the inner wall of an outlet leg thereof, with said pocket member being closed at its lower end, said pocket member being open at its upper end only, for receiving an electrode therein, but being connected to the outlet end of said U-shaped member in gas sealing relation, with said outlet leg of said U-shaped member and said pocket member cooperating to restrict the gas passageway through said U-shaped tubular member to an elongated thin-walled annulus, with an elongated first electrode being disposed in said pocket member without passing through the lower end thereof. with an elongated second electrode disposed about the exterior of the outlet leg of said U-shaped member for substantially the length of said pocket member, with said members being constructed of a material that is electrically nonconductive relative to said electrodes, with said electrode being adapted for connection to a high voltage source for providing an electrostatic field between the electrodes, and with the electrodes cooperating with said members to provide means, when connected to the voltage source, for precipitating the substance to be collected from the gas substantially entirely about a surface of said thin-walled annulus and free of contact of the gas with any portions of said electrodes, said first electrode having no highly electrically conductive path connecting said first electrode with said annulus.

2. The apparatus of claim 1, including in the combination, voltage source means for providing an electrostatic field.

3. The apparatus of claim 1, including in the combination, cooling means for receiving a lower portion of the U-shaped member therein, for cooling the same.

4. The apparatus of claim 1, wherein said second electrode comprises metal foil wrapped about the outlet leg of said U-shaped member.

5. The apparatus of claim 1, wherein said U-shaped member and said pocket member are of glass construction.

6. The apparatus of claim 5, wherein said U-shaped member and said pocket member are connected by a glass-to-glass seal, to be of unitary construction.

References Cited

UNITED STATES PATENTS

| | | | |
|---|---|---|---|
| 1,130,212 | 3/1915 | Steere | 55—123X |
| 1,204,906 | 11/1916 | Schmidt et al. | 55—135 |
| 1,334,231 | 3/1920 | Davidson | 55—120X |
| 1,358,031 | 11/1920 | Smith | 55—123X |
| 1,377,363 | 5/1921 | Moon | 55—10 |
| 1,413,877 | 4/1922 | Schmidt | 55—8 |
| 1,787,955 | 1/1931 | Rosencrans | 55—123 |
| 1,992,113 | 2/1935 | Anderson | 55—148 |
| 2,307,602 | 1/1943 | Penney et al. | 55—139X |
| 2,800,193 | 7/1957 | Beaver | 55—135X |
| 3,257,778 | 6/1966 | Flagg | 55—118 |
| 2,556,832 | 6/1951 | Vollrath | 73—27 |
| 2,705,544 | 4/1955 | Richardson | 55—101 |
| 3,124,952 | 3/1964 | Johnson | 73—23.1 |
| 3,185,211 | 5/1965 | Crawford, Jr., et al. | 165—71 |

FOREIGN PATENTS

| | | | |
|---|---|---|---|
| 260,185 | 5/1913 | Germany | 55—123 |

OTHER REFERENCES

Ross et al., "An Electrostatic Precipitator for a Preparative Gas Chromatograph," Journal of Gas Chromatography, October 1964, pp. 340–341.

Strong et al., Procedures in Experimental Physics, Prentice-Hall Inc., New York, N.Y., copyright 1938, pp. 16–21.

DENNIS E. TALBERT, JR., Primary Examiner

U.S. Cl. X.R.

55—135, 146, 150, 155, 197, 269, 270, 318, 386, 461; 73—23.1